Dec. 10, 1929.  J. B. KAUSAL  1,738,712

CROSS AISLE LIGHT

Filed June 18, 1928

Witnesses:
K. W. Fischel
F. C. Appleton

Inventor:
Joseph B. Kausal.
By: Joshua R H Fork
His Attorney.

Patented Dec. 10, 1929

1,738,712

UNITED STATES PATENT OFFICE

JOSEPH B. KAUSAL, OF CHICAGO, ILLINOIS

CROSS-AISLE LIGHT

Application filed June 18, 1928. Serial No. 286,161.

This invention relates to an improved cross aisle light for the purpose of furnishing a limited amount of illumination in the cross aisles of theaters, auditoriums, motion picture houses and the like, and also adapted for use as a program reading light. An object of the invention is the provision of a light of this character which will supply a limited amount of illumination in the vicinity of the lower area of the cross aisles so as not to cast light upwardly into the auditorium where darkness or semi-darkness is desired during the performance, and which will offer the least possible obstruction in the limited space available.

Other objects will appear hereinafter.

The invention consists in the combinations and arrangements of parts hereinafter described and claimed.

The invention will be best understood by reference to the accompanying drawings forming a part of this specification, and in which.

Figure 1:
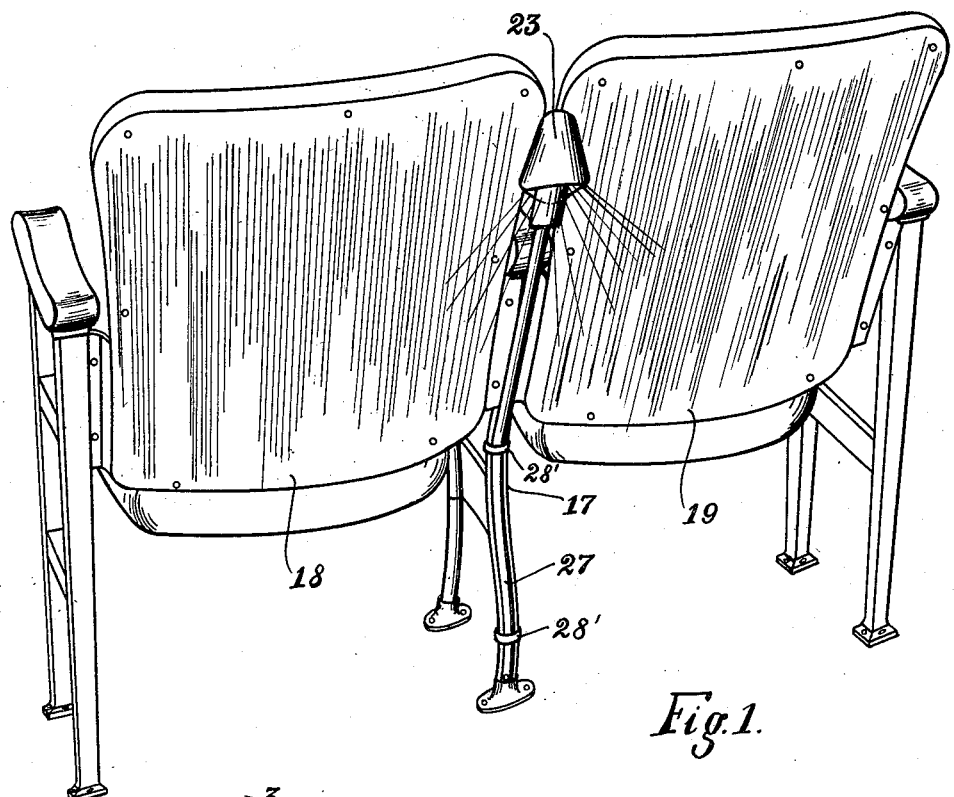
Fig. 1 is a perspective view of a device of the invention mounted in position between the backs of two adjoining theater seats.
Figure 2:
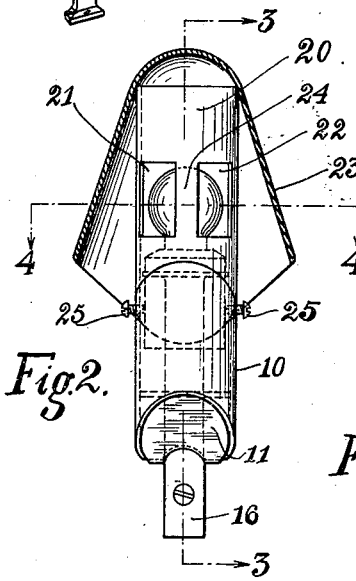
Fig. 2 is a front elevational view of the device with the hood portion in section.

The device of the invention is intended to be secured between two adjoining theater seats below the normal line of vision of persons in the audience, and is further intended to cast a soft glow of light in each lateral direction whereby sufficient illumination is provided throughout the lower area of the cross aisles by placing a device at every alternate space between adjoining seats. The construction and arrangement of the device is such that the light is cast laterally and rearwardly at the proper angle to enable patrons to read programs and furnish illumination on the floor of the cross aisles for the convenience of patrons in taking or leaving their seats. At the same time, the source of light being concealed, and the amount and extent of the illumination being limited, the lights need not be extinguished during the performance.

As illustrated in the drawings, the preferred embodiment of the device comprises a cylindrical supporting member 10 into which is fitted a bracket member 11 having a horizontally extending plate 12 supporting a two piece socket 13 which carries lamp 14. The socket is preferably smaller than the standard size and a small 10 watt lamp has been found to furnish a sufficient amount of illumination for the purpose. In modern seating construction, a T-iron is usually employed as part of the supporting structure between two adjoining seats and furnishes a convenient and rigid mounting for the lighting device. The two downwardly extending stems 15 and 16 of the members 10 and 11, respectively, may be bolted to the vertical extending T-iron 17 extending between the two seats 18 and 19.

Figure 3:
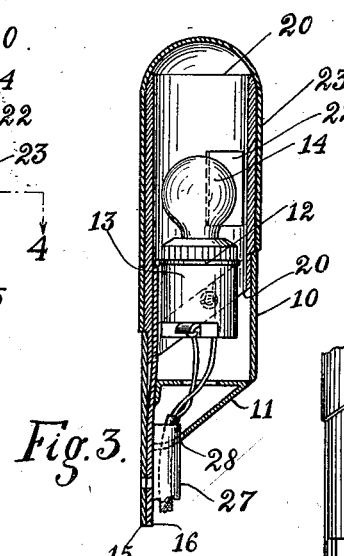
Fig. 3 is a vertical sectional view taken on the line 3—3 of Fig. 2.
Figure 4:
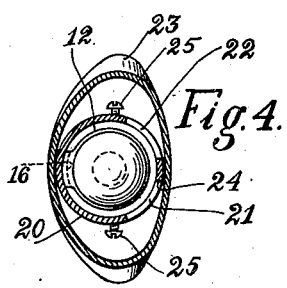
Fig. 4 is a horizontal sectional view taken on the line 4—4 of Fig. 2.
Figure 5:
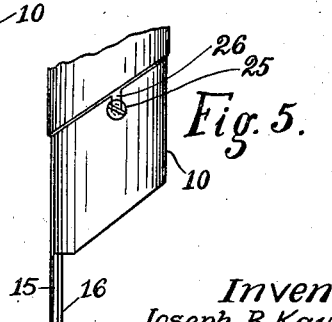
Fig. 5 is a side elevational view showing the manner of mounting the removable hood member.

The lamp casing consists of a cylindrical member 20 having rectangular light openings 21 and 22, covered by a light directing hood member 23. Referring to Fig. 3, it will be noted that hood member 23 contacts with the vertical portion 24 of member 20 between the light openings 21 and 22, and as member 23 is conical in shape at each side of the central member 20, the light is divided and cast downwardly and slightly outwardly at each side of the device. Member 23 may for convenience be removably attached to the supporting member 10 by means of bayonet screws 25 adapted to fit into slots 26. A safe and convenient means of leading wires to the device is by the use of metallic conduit 27, oval in shape and adapted to extend through opening 28 in member 11 and conduit 27 may be secured to T-iron 17 by means of clamps 28'. As will be seen in Fig. 4, the device is shaped so as to fit into the depression occurring at the meeting edges of two adjoining theater seats, and thus the objection heretofore encountered in lights of this type because of the projection into the space of the cross aisle and the consequent obstruction and inconvenience to patrons has been overcome.

The light is compact so as to occupy a minimum of space and is so constructed to fit between two adjoining seats so as not to project into the cross aisle to any greater extent than the central curved portion of the seats. Furthermore the construction and arrangement of the light openings and shading portions are such that the lights may remain lit during the performance without interfering with the relative darkness required in the auditorium, and yet enable patrons to refer to programs or other reading matter. Not only does the installation between adjoining seats conserve space, but it enables a single light to furnish illumination for two patrons, thus necessitating the provision of but one-half the number of lights required where a light is supplied for each patron.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A cross aisle light adapted to be mounted in the depression between adjoining theatre seats of a theatre cross aisle, comprising a supporting member, a lamp bracket mounted upon said supporting member, a lamp casing comprising a vertically extending cylindrical member provided with a lateral light emitting opening, and a light directing hood member positioned opposite said light emitting opening and adapted to conceal said light opening and direct rays of light downwardly for illumination of the lower portion of the cross aisle, the portion of said hood member adjacent the cross aisle being flattened against said casing to avoid projection.

2. A cross aisle light adapted to be mounted in the depression between adjoining theatre seats of a theatre cross aisle, comprising a supporting member, a lamp bracket mounted upon said supporting member, a lamp casing comprising a vertically extending cylindrical member provided with a lateral light emitting opening, and a light directing hood member positioned opposite said light emitting opening and adapted to conceal said light opening and direct rays of light downwardly for illumination of the lower portion of the cross aisle, the portion of said hood member adjacent the cross aisle being flattened against said casing to avoid projection, and said hood member adapted to extend below said light emitting opening.

3. A cross aisle light adapted to be mounted in the depression between adjoining theatre seats of a theatre cross aisle, comprising a supporting member, a lamp bracket mounted upon said supporting member, a lamp casing comprising a vertically extending cylindrical member provided with lateral light emitting openings, and a light directing hood member positioned opposite said light emitting openings and adapted to conceal said light openings and direct rays of light downwardly for illumination of the lower portion of the cross aisle, the portion of said hood member adjacent the cross aisle and between said lateral light openings being flattened and depressed against said cylindrical member to avoid projection.

4. A cross aisle light adapted to be mounted in the depression between adjoining theatre seats of a theatre cross aisle, comprising a supporting member, a lamp bracket mounted upon said supporting member, a lamp casing comprising a vertically extending cylindrical member provided with lateral light emitting openings, a light directing hood member positioned opposite said light emitting openings and adapted to conceal said light openings and direct rays of light downwardly for illumination of the lower portion of the cross aisle, the portion of said hood member adjacent the cross aisle and between said lateral light openings being flattened and depressed against said cylindrical member to avoid projection, and means for securing said device to the seat supporting structure extending between said adjoining seats.

In testimony whereof I have signed my name to this specification.

JOSEPH B. KAUSAL.